United States Patent Office 3,449,446
Patented June 10, 1969

3,449,446
PURIFICATION OF ALCOHOLS
Francis J. Higgins, Greenville, S.C., assignor to Continental Oil Company, Ponca City, Okla., a corporation of Delaware
No Drawing. Continuation-in-part of application Ser. No. 523,031, Jan. 26, 1966, which is a continuation-in-part of application Ser. No. 398,074, Sept. 21, 1964. This application July 8, 1968, Ser. No. 743,013
Int. Cl. C07c 29/24
U.S. Cl. 260—643
16 Claims

ABSTRACT OF THE DISCLOSURE

Alcohols derived from aluminum alkoxides containing objectionable amounts of odor precursors or impurties are improved by dissolving the alcohol in a suitable solvent and crystallizing the alcohol out and recovering same.

---

This is a continuation-in-part of my application Ser. No. 523,031, filed Jan. 26, 1966, now abandoned which was a continuation-in-part of Ser. No. 398,074, filed Sept. 21, 1964, now abandoned.

This invention relates to the purification of alcohols derived from alkyl aluminum, particularly the invention relates to the removal of odor precursors from such alcohols.

Alcohols are now made from alkyl aluminum compounds by oxygen oxidation of these to the corresponding alkoxides, which alkoxides are hydrolyzed to the corresponding alcohols.

Side reactions produce esters, ethers, acids, diols, aldehydes and hydrocarbons which are present in the alcohol as produced in impurity amounts.

Alkyl sulfates made from these alcohols have a disagreeable odor. It has been determined that impurities in the alcohol react with sulfuric acid to produce this odor. These impurities are called odor precursors.

Normally these alcohols are produced from alkyl aluminum which has been prepared as an ethylene growth reaction product. As a result, the alcohol product includes a wide range of carbon atom numbers. The reaction is controlled so that most of the alcohols have less than about 20 carbon atoms. In the distillation operation, a bottoms fraction is produced which includes a mixture of alcohols having about 20 or more carbon atoms, and higher boiling oxygen-containing compounds and also higher boiling hydrocarbons. This bottoms fraction is also highly colored. It is difficult to produce substantially pure alcohols from this mixture; therefore, this mixture is of little economic value at this time.

In my first filed application 398,074, supra, I disclosed and claimed broadly the purification of raw alcohols derived from the oxidation of alkyl aluminum having about 8 to 30 carbon atoms in the alcohol, said alcohol containing objectionable amounts of impurities, by a crystallization process wherein a solution of this alcohol in a solvent such as dialkyl ketones, 1-n aliphatic alcohols (referred to sometimes as alkanols), esters derived from alcohols and fatty acids (referred to sometimes as alkyl alkanoates), or n-paraffins of 3 to 5 carbon atoms is cooled to obtain a precipitate of solid alcohols of decreased odor precursor content and a solvent-rich phase containing the removed odor precursors. In another aspect of the invention, raw alcohols of the type mentioned containing a mixture of 18-28 carbon atom alcohols and impurities are purified by contacting the raw mixture with methanol or ethanol at a temperature and in an amount of solvent such that two separate liquid phases are obtained. The purified alcohol appears in the raffinate phase. The solvent extract phase contains the undesirable impurities.

In Ser. No. 523,031, it was disclosed that in addition to the paraffins of 3 to 5 carbon atoms disclosed in the prior application, paraffins of 3 to 12 carbon atoms, preferably 3 to 8 carbon atoms, are suitable solvents for the crystallization of these higher molecular weight alcohols. However, the solvent must be liquid at the temperature where the alcohol being purified crystallizes. Thus, when the feed alcohol contains C-8 alcohols, then the 3–5 paraffin range is still preferred. However, with $C_{18+}$ alcohol feed, then the higher molecular weight paraffins can be used to advantage. It was also disclosed that cycloparaffins in the range of $C_5$ to $C_{12}$, and particularly cyclopentane, cyclohexane, cycloheptane and cyclooctane are excellent solvents for the crystallization. In addition, it was disclosed that aromatic hydrocarbons can be used as the crystallization solvent, especially benzene, toluene, xylene, methylethylbenzene and the like. It was also found that in the extraction process, propanol and isopropanol can be used as well as methanol and ethanol.

An object of the invention is a process for removing alkyl sulfate odor precursors from alcohols derived from alkyl aluminum compounds.

Another object is a process for purifying the "$C_{20+}$ alcohol" bottoms fraction derived from a broad range alcohol mixture produced from alkyl aluminum compounds. Other objects of the invention will become apparent in the course of the detailed description thereof.

In summary, raw alcohol derived from the oxidation of alkyl aluminum having about 8-30 carbon atoms in the alcohol, containing objectionable amounts of odor precursor bodies can be improved in this regard by a crystallization process wherein a solution of this alcohol in an effective amount of a solvent which may be dialkyl ketone, alkanol, alkyl alkanoate, paraffin, cycloparaffin, or aromatic is cooled to obtain a precipitate of solid alcohol of decreased odor precursor content, and a solvent-rich phase containing the removed odor precursors. The aforesaid oxygen containing solvents have 1–4 carbon atoms in each alkyl group and 2–4 carbon atoms in the lower fatty acid portion of the alkyl alkanoate solvent. The paraffins have 3–12 (preferably 3–8 carbon atoms). The cycloparaffins contain 5–12 carbon atoms (preferably 5 to 8). The aromatics can be substituted with alkyl group, preferably of 1 to 4 carbon atoms in each alkyl group and not more than 10 carbon atoms in the total substituted alkyl groups. The solid precipitate is separated from the solvent phase; it is freed of residual solvent to obtain an alcohol produce of decreased odor precursor content.

Another process of the invention involves a liquid-liquid extraction operation of raw alcohols containing a mixture of 18–28 carbon atoms and color bodies and other organic impurities. In this extraction process the raw alcohol is contacted by an alkanol solvent of 1 to 3 carbon atoms at a temperature and in an amount of solvent such that two separate liquid phases are obtained. The alcohol appears in the raffinate phase. The solvent extract phase contains the color bodies. An alcohol product of improved color is recovered from the raffinate phase.

The invention is directed to the aliphatic alcohols (1-alkanols) derived from alkyl aluminum compounds through aluminum alkoxides and hydrolysis thereof to the corresponding alkanols. The production of alcohols by this route is now conventional. For illustrative procedures see U.S. Patents Nos. 3,017,438; 3,053,905; 3,070,-616; 3,087,954; 3,093,691; 3,097,226; and 3,104,251, also Chemical Engineering Progress 58, 85–88 (May 1962).

The raw alcohol has about 8–30 carbon atoms. The alcohols are commonly produced as mixtures of alcohols of different carbon atom numbers. Close boiling fractions will contain small amounts of alcohols of lower and higher carbon atom number than the specified major components. Especially suitable feeds to the crystallization process are the alcohols having 12–18 carbon atoms or mixtures of these alcohols.

In one conventional alcohol preparation, a wide range product mixture is obtained. This wide range mixture is fractionated so as to produce a 20+ bottoms; this bottoms alcohol is a mixture of alcohols having about 18–30 carbon atoms, mainly 20–22 carbon atoms. Also, the mixture includes high boiling hydrocarbons and other oxygen-containing compounds. This high boiling bottoms is distinguished by the presence of color bodies which additionally interfere with utilization of these alcohols in commerce.

The alcohol charged to the process may be truly "raw" in the sense that no treatment at all has been given the alcohol to remove (or convert) the impurities present therein, or the alcohol may be raw in the sense that treatment, such as hydrogenation, has not decreased the odor precursor content, or other impurities, to the desired degree, or a further distillatory step may have been used to produce a more fractionated material.

The crystallization process

In the crystallization process of the invention, the raw alcohol is dissolved in a solvent. The solvent used in this process is dialkyl ketone having 1–4 carbon atoms in each alkyl group, or alkanol having 1–4 carbon atoms, or alkyl alkanoate having 1–4 carbon atoms in the alkyl group and 2–4 carbon atoms in the lower fatty acid portion, or paraffin having 3–12 carbon atoms or cycloparaffins of 5 to 12 carbon atoms or aromatic hydrocarbons. Illustrative ketones are acetone, methyl ethyl ketone, diethyl ketone, and methyl isobutyl ketone. Illustrative alkanols are methanol, ethanol, and isopropanol. Illustrative alkyl alkanoates are ethyl acetate, 5-butyl acetate, and methyl butyrate. Illustrative paraffins are butane, isobutane, isopentane, hexane, octane, isooctane, nonane, decane, dodecane and isomers thereof.

Illustrative of the cycloparaffins are cyclopentane, cyclohexane, cycloheptane, cyclooctane, and the like. Illustrative of the aromatics are benzene, toluene, xylene, 1 methyl-3 ethyl benzene, 1 methyl-2 propyl benzene, 1-methyl-2 ethyl-4 butyl benzene and the like.

Commonly, the solvents are used in substantially anhydrous form. However, water may be present in some of the solvent in amounts which are determined by the type of alcohol feed, the type of solvent present, and the desired temperature of operation.

Sufficient solvent is used to form a homogeneous solution at a temperature above the crystallization (precipitation) temperature. The solution is then cooled to a temperature at which a precipitate is obtained. The final temperature is determined by the characteristics of the solution, and the characteristics of the product alcohol desired.

The weight ratio of solvent to alcohol will depend to a large degree upon the nature of the alcohol and the solvent; and, as has been stated, sufficient solvent is utilized to form a homogeneous solution. This ratio can be as low as 1:1 but will generally be at least about 2:1. While there is no maximum limit, one generally will not use more than about 10:1, since little advantage can be gained at the higher ratio; therefore, I prefer a ratio from about 2:1 to about 8:1.

The solid crystalline material (precipitate) is separated from the solvent phase. This may be accomplished by any of the conventional procedures, such as, gravity settling and decantation, filtration or centrifuging. It is, of course, within the scope of the invention to wash the precipitate with fresh solvent. The recovered alcohol contains some solvent, and it is desirable to remove the solvent. This is conveniently accomplished by distillation.

It has been discovered that the $C_{20}+$ fraction can be processed to decrease the color body content before separating other impurities. This alcohol is contacted with the solvent under conditions such that the color bodies are not taken into, or are thrown out of, solution. Commonly, a temperature of above about 80° F. is used. The color body phase is separated from the solvent phase which includes the bulk of the alcohols; the solvent phase is then cooled to precipitate solid alcohols, commonly at a temperature of below about +50° F., which solid alcohols are then separated from the second solvent phase which contains organic impurities removed from the alcohol.

In a particular embodiment of this crystallization process, raw alcohol having about 12–18 carbon atoms is dissolved in dialkyl ketone having 1–4 carbon atoms. The solution is chilled to below about +20° F., forming a precipitate of solid alcohol; the precipitate is recovered by filtering away the ketone phase. Commonly, the solutions are washed with fresh ketone to remove occluded ketone phase. The ketone remaining in the recovered alcohol is stripped away to leave a product substantially free of odor precursors.

In another embodiment of this process, raw alcohol having about 12–18 carbon atoms is dissolved in paraffin having 3–6 carbon atoms. The solution is chilled to below about 0° F. (zero) to obtain a precipitate of solid alcohol. The precipitate is recovered by filtration and preferably washing with fresh paraffin. Paraffin is stripped from the recovered alcohol to obtain a product substantially free of odor precursors.

In selecting the particular solvent for crystallization, the nature of the alcohol to be purified is considered. That is, the solvent must remain liquid at the precipitation or crystallization temperature of the alcohol being purified. Also, the nature of the contaminant should be considered. The raw alcohol, as produced, will contain a high percent of carbonyl contaminants and possibly some diols, olefins and paraffinic impurities. I prefer to use one of the oxygen-containing solvents as set forth above when treating such raw alcohols. However, if the alcohols have been distilled into close cut fractions, some of the carbonyl compounds tend to boil in the same range as the $C_{12}$ alcohols, thus, if the raw feed is $C_{10-12}$ or $C_{12-14}$ alcohol, then again I prefer the oxygen-containing solvent since these solvents are particularly suitable for such carbonyl compounds. Also, the heavier carbonyl compounds tend to remain with the bottoms, and again I prefer the oxygen-containing solvents. On the other hand in alcohol cuts of other carbon chain lengths, the impurities appear to be more selectively held by the hydrocarbon solvents, and thus I prefer these solvents for such cuts. It should be understood, however, that any of the solvents which meet the test of being liquid at the crystallization temperature of the alcohol can be used. It is also within the scope of the invention to crystallize first in one type of solvent, re-dissolve in a second type of solvent and recrystallize. This would be beneficial where the alcohol has a high percentage of impurities. It is also within the scope of the invention to utilize multiple crystallizations from the same solvent.

In addition to improving the purity of the alcohol being treated, the crystallization method can also be used to facilitate separation of alcohols of different crystallization temperatures. For example, the solution is chilled by stages and precipitate formed at different temperatures can be separated as they form.

Illustrations

The following illustrative examples of the crystallization process were carried out by forming a solution of alcohol and solvent above the freezing point of the alcohol. The clear solution was chilled while being agitated to the desired temperature in a bath. The slurry of solvent phase, and solid alcohol, was vacuum filtered. Cold solvent was used to wash the recovered solid alcohol. The solvent remaining in the recovered alcohol was removed by simple distillation taking overhead about 5% of the alcohol to make sure all the solvent had been removed. (Tests established that this solvent removal operation did not affect the odor of the product.)

The alcohol sulfate odor rating system is based on the following.

Type of odor:
T (typical alcohol sulfate type order)
U (untypical alcohol sulfate type odor)
O (no odor)

Intensity of odor:
1 Faint
2
3 Moderate
4
5 Strong

The order rating received on each alcohol sulfate sample is the average value of ratings by five members on the odor panel. Originally, one odor rating was given per sample submitted. Recent ratings consist of two numbers: (1) an initial rating based on evaluation immediately after removal of the cap from the sample and (2) an aired odor rating evaluated after the sample had aired for ten minutes.

The odor rating was given to alcohols which had been converted to the alkyl sulfate by treatment with chlorosulfonic acid using a standard procedure.

EXAMPLE A

The feed to this example was a 1216 commercial alcohol mixture, as produced, containing 12, 14 and 16 carbon atom 1-alkanols with some 10 and 18 carbon atom 1-alkanols also present.

Acetone to alcohol weight ratio

The effect of weight ratio of acetone to alcohol on alcohol sulfate odor is shown in the following Table I.

TABLE I

| Run No. | Crystallization | | Percent alcohol recovered | Sulfate odor rating | |
|---|---|---|---|---|---|
| | Temp., °F. | Weight ratio, acetone/ROH | | Initial | Aired |
| Feed | | | | T-3.0 | T-1.9 |
| a | -4 | 8.0 | 73 | T-0.8 | T-0.5 |
| b | -4 | 5.0 | 74 | T-1.0 | T-0.5 |
| c | -4 | 3.0 | 77 | T-1.9 | T-0.9 |

A trend of odor level reduction is shown with an increase in weight ratio of acetone to alcohol.

EXAMPLE B

Paraffin solvents

Butane and pentane were very effective as crystallization solvents for the 1216 alcohol. The alcohol sulfate odor level was as good as that obtained by crystallization in acetone. The data are shown in Table II.

TABLE II

| Run No. | Crystallization | | Solvent/ROH, weight ratio | Percent alcohol recovery | Sulfate odor | |
|---|---|---|---|---|---|---|
| | Solvent | Temp., °F. | | | Initial | Aired |
| f | Pentane | 10 | 3.7 | | T-2.0 | T-0.6 |
| g | Butane | 0 | 5.0 | 93 | T-0.75 | T-0.5 |
| h | do | -20 | 2.5 | 97 | T-0.95 | T-0.45 |
| i | do | -50 | 8.0 | 81 | T-0.51 | T-0.41 |

EXAMPLE C

Methanol was used in two runs as a crystallization solvent for 1216 alcohol. The data are shown in Table III.

TABLE III

| Run No. | Temp., °F. | Weight ratio methanol/1216 alcohol | Percent alcohol recovery | Sulfate odor | |
|---|---|---|---|---|---|
| | | | | Initial | Aired |
| j | 10 | 5.0 | 29.2 | T-0.6 | T-0.2 |
| k | 0 | 5.0 | 47.8 | U-0.6 | 0.0 |

EXAMPLE D

Crystallizations were carried out on the 1216 alcohol using certain chlorinated hydrocarbon solvents: Freon 12, chloroform, carbon tetrachloride, dichloroethylene and trichloroethylene—these were ineffective either because of low odor improvement and/or low yield of alcohol. Liquid ammonia was tried, unsuccessfully, as a solvent.

EXAMPLE E

Several runs were made in which the liquid alcohol was sprayed into cold acetone. This procedure was effective in lowering the sulfate odor, but in general was not as effective as the solution procedure of Example A.

EXAMPLE F

Ten g. of $C_{20+}$ bottoms alcohol having a brown color and strong odor were dissolved in 50 ml. of acetone at +120° F. The solution was cooled to 76° F.; during the cooling a dark brown precipitate formed. This was filtered off and washed with cold acetone. The brown solid was much harder than the $C_{20+}$ alcohols.

The filtrate was further chilled to +50° F. More precipitate was formed; this was filtered off and washed with cold acetone. After solvent removal, the second precipitate was a softer material much lighted in color than the $C_{20+}$ bottom alcohol and having much less odor.

EXAMPLE G

For detergent use, the alcohols of the type mentioned above and hereinafter referred to as "ALFOL" (a trade mark) alcohols as obtained by the growth reaction of aluminum trialkyl with ethylene, have been primarily useful in the 8 to 18 carbon atom range and indicated as "ALFOL" $C_{8-18}$. The alcohols containing 20 or more carbon atoms have found only limited applications. However, there has been a demand for these alcohols in high purity and particularly when separated into $C_{20}$, $C_{22}$ and $C_{24}$ cuts leaving $C_{26+}$ only in the bottoms. However, by fractional distillation alone, the alcohols are not of sufficient purity to command much attention. These high molecular weight alcohol fractions are amenable to purification by crystallization from solvents. As has been previously stated, the hydrocarbon solvents are preferred with such individual cuts.

Several crystallization runs were made to illustrate the effectiveness of crystallizations on $C_{20}$ and $C_{22}$ alcohols from various hydrocarbon solvents.

Several runs were made utilizing "ALFOL" $C_{22}$ alcohols by combining 50 ml. of alcohol and 250 ml. of solvent in a beaker and heating until the alcohol melted and a homogeneous solution was formed (about 120° F.). The solution was then cooled with stirring to approximately 32° F. The slurry was then filtered in a Buechner funnel using filter paper. The solid alcohol product from the filter was then charged to a flask and heated under vacuum (10–20 mm. Hg) to remove the solvent. The product alcohol was analyzed for carbonyl, hydroxyl and iodine numbers. The results are shown in Table IV.

TABLE IV

| Run No. | Solvent, 250 ml. | Total alcohol recovered, weight percent | Alcohol analysis | | |
|---|---|---|---|---|---|
| | | | c=0 p.p.m. | OH, weight percent | $I_2No$ |
| 1 | Hexane | 68 | 3,217 | 5.01 | 6.59 |
| 2 | Toluene | 70 | 2,000 | 5.12 | 2.96 |
| 3 | Benzene* | 69 | 2,241 | 5.05 | 3.20 |
| Feed | | | 8,654 | 3.30 | 27.15 |

*Filtered at 39° F.

In run one, the crystals were small but filtered readily. In runs two and three, the crystals were large and also filtered rapidly.

Two additional crystallization runs were made using hexane and toluene with a solvent volume ratio of 6:1 to crystallize on "ALFOL" $C_{20}$ alcohol. The general crystallization procedure used with runs 1, 2 and 3 was used. The results are given in Table V.

TABLE V

| Run No. | Solvent | Solvent-alcohol wt. ratio | Total alcohol recovered, weight percent | Alcohol analysis | | $I_2No$ |
|---|---|---|---|---|---|---|
| | | | | c=0 p.p.m. | OH, wt. percent | |
| 4 | Hexane | 4.5 | 85 | 180 | 5.65 | 0.47 |
| 5 | Toluene | 5.5 | 90 | 525 | 5.69 | 0.63 |
| Feed | $C_{20}$ | | | 1,205 | 5.59 | 1.74 |

Three crystallization runs were made to compare single pass, single pass with wash, and double pass crystallization using an "ALFOL" $C_{22}$ alcohol. A hexane to alcohol volume ratio of six to one was used for each run.

In run six, the same procedure was used as in runs 1–5. The single pass of run seven was similar to run six except that only half of the solvent was used (volume ratio of 3:1). The filtered alcohol was then slurried with the remaining fresh solvent and refiltered. This run was, in effect, a single pass crystallization followed by a fresh solvent wash. In run eight, both runs were similar to run six except that only one-half of the solvent was used for each pass. This was a true double pass crystallization in that the alcohol from the first pass was added to the remaining fresh solvent, heated to form solution and recrystallized. It is obvious that the total solvent for each of these three runs was the same. The results are shown in Table VI.

TABLE VI

| Run No. | Total alcohol recovered, wt. percent | Alcohol analysis | | |
|---|---|---|---|---|
| | | c=0 p.p.m. | OH, wt. percent | $I_2No$ |
| 6 | 75.5 | 3,095 | 5.24 | 5.19 |
| 7 | 76.0 | 3,538 | 5.43 | 1.98 |
| 8 | 71.0 | 1,852 | 5.21 | 0.98 |
| ALFOL $C_{22}$ | | 8,654 | 3.30 | 27.15 |

Extraction process

It has also been discovered that a raw alcohol mixture having about 18–28 carbon atoms, i.e., a so-called $C_{20+}$ bottoms fraction can be improved with respect to color, odor, and odor precursors by extraction with an alkanol solvent. This alkanol solvent has 1–3 carbon atoms, e.g., methanol, ethanol, isopropanol, and n-propanol. The extraction is carried out under conditions of amount of solvent and temperature such that two separate liquid phases are obtained. The alkanol raffinate phase is of improved color and odor—these bodies having passed into the extraction phase, the alcohol present in the raffinate phase may be readily separated from alkanol solvent by distillation.

Particularly in the case of methanol solvent, the extraction efficiency is improved by the presence of water.

The extraction process of the invention is illustrated by the following examples, wherein the raw alcohol feed was a bottoms fraction of the distillation of a wide range alcohol mixture produced from alkyl aluminums obtained by ethylene growth reaction operation. This so-called $C_{20+}$ alcohol consisted of about 72 weight percent raw alcohols and about 28 weight percent of nonalcoholic components, which includes both oxygen-containing components and hydrocarbons. The alcohol compoents included: $C_{18}$, 3 weight percent; $C_{20}$, 54%; $S_{22}$, 25%, $C_{24}$, 10% and $S_{26}$, 8%. Significant amounts of $C_{28}$ material and some $C_{16}$ material were present.

EXAMPLE H

These extraction runs were conducted in a 500 ml jacketed separatory funnel. The extraction was performed at approximately 135° F. with a solvent to feed weight ratio of 2.3:1. The alcohol bottoms feed was the same in all cases for the first extraction. For the second extraction, the recovered alcohol fraction from the first extraction was extracted a second time with fresh solvent. Inspection of data indicates that the extraction efficiency is materially improved by increasing the amount of water (within limits) in the methanol solvent (methanol).

(I) Using anhydrous methanol in two extractions, the alcohol product contained about 82% of alcohol.

(II) With a solvent containing 2.7% water and the remainder methanol in two extractions, the alcohol product was 91% alcohol component.

(III) A solvent consisting of 4.3% water and the remainder methanol gave in one extraction a product which was virtually pure alcohol. However, in this run the yield was relatively low.

EXAMPLE I

Ten g. of $C_{20+}$ with 200 ml. of Formula 30 alcohol (90% ethanol; 10% methanol) produced the same dark bottom phase at 140° F. Adding 20 ml. of water increased the bottom layer. Adding 20 ml. more of water caused a phase inversion in which the dark phase came to the top. Twenty ml. more of water produced more dark layer on top. Two more 20 ml. additions of water (total of 100 ml. of water added) produced a little more top dark phase at 140° F. The mixture was transferred to a beaker; and at 84° F., the darker, brown layer solidified on top, leaving the larger, clear bottom phase with some white precipitate which formed at the cooler temperature.

Thus having described the invention, what is claimed is:

1. A process comprising:
   (a) forming a solution of raw alcohol having about 8–30 carbon atoms, derived from the oxidation of alkyl aluminum and hydrolysis of the alkoxide obtained aluminum, and a solvent selected from the class consisting of dialkyl ketones having 1–4 carbon atoms in each alkyl group, alkanols having 1–4 carbon atoms, paraffins having 3–12 carbon atoms, and single ring aromatic hydrocarbons wherein the weight ratio of solvent to raw alcohol is in the range 2:1 to 10:1 to form a homogeneous solution;
   (b) cooling said solution to obtain a precipitate of solid alcohol of improved odor precursor content; and
   (c) separating said precipitate from the solvent phase.

2. The process of claim 1 wherein said solvent is acetone.

3. The process of claim 1 wherein said solvent is butane.

4. The process of claim 1 wherein said raw alcohol is a mixture of alcohols having about 18–28 carbon atoms, and this alcohol is contacted with said solvent at a temperature whereat color bodies are thrown out of solution, separated, and the alcohol-solvent phase colored to precipitate solid alcohol.

5. The process of claim 4 wherein said solvent is hexane.

6. The process of claim 4 wherein said solvent is toluene.

7. A process for removal of odor precursors from raw alcohol having about 12–18 carbon atoms derived from the oxidation of alkyl aluminum and hydrolysis of the alkoxide obtained which process comprises:
   (a) forming a solution of 1 part by weight of said raw alcohol in 2 to 10 parts by weight of dialkyl ketone having 1–4 carbon atoms in each alkyl group so as to from a homogeneous solution;
   (b) chilling said solution to below +20° F. to form a precipitate of solid alcohol;

(c) recovering said precipitate by filtration; and (d) stripping ketone from said recovered alcohol to obtain a product substantially free of odor precursors.

8. A process for removal of odor precursors from raw alcohol having about 12 to 18 carbon atoms derived from the oxidation of alkyl aluminum and hydrolysis of the alkoxide obtained which process comprises:

(a) forming a solution of about 1 weight part of said raw alcohol in 2 to 10 parts by weight of paraffin having 3–5 carbon atoms;

(b) chilling said solution to below about 0° F. to form a precipitate of solid alcohol;

(c) recovering said precipitate by filteration; and (d) stripping paraffin from said recovered alcohols to obtain a product substantially free of odor precursors.

9. A process comprising:

(a) forming a solution of about 1 weight part of raw alcohol mixture having about 18–28 carbon atoms, which alcohol had been prepared from the oxidation of alkyl aluminum and hydrolysis of the alkoxide obtained, said alcohol including color bodies and organic impurities, and 2 to 10 parts by weight of a solvent selected from the class consisting of dialkyl ketones having 1–4 carbon atoms in each alkyl group, and maintaining said solution above about +80° F. under conditions to form a first precipitate comprising color bodies;

(b) separating said first precipitate from solvent phase;

(c) cooling said solvent phase to obtain a second precipitate of solid alcohol of decreased color precursor content; and (d) separating said second precipitate from a second solvent phase.

10. The process of claim 9 wherein said solvent is acetone.

11. The process of claim 9 wherein the cooling of step (c) is to a temperature of below about +50° F.

12. The process of claim 1 wherein said raw alcohol is a $C_{20}$, $C_{22}$ or $C_{24}$ alcohol fraction; the solvent is a hydrocarbon solvent selected from the group consisting of 3 to 12 carbon atom paraffins and single ring aromatics; and the separated precipitate is dried thereby obtaining an alcohol of substantially higher purity than the dissolved alcohol.

13. The process of claim 12 wherein said solvent is a normal paraffin of 3 to 12 carbon atoms.

14. The process of claim 13 wherein said solvent is hexane.

15. The process of claim 12 wherein said solvent is a single ring aromatic.

16. The process of claim 15 wherein said solvent is toluene.

References Cited

UNITED STATES PATENTS

| | | |
|---|---|---|
| 2,809,884 | 10/1957 | Ratje. |
| 2,876,253 | 3/1959 | Hughes et al. |
| 2,972,636 | 2/1961 | Hartmann et al. |
| 3,150,193 | 9/1964 | Acciarri et al. |
| 3,188,354 | 6/1965 | Roming. |
| 3,296,318 | 1/1967 | Starks. |

FOREIGN PATENTS

| | | |
|---|---|---|
| 1,134,907 | 12/1956 | France. |
| 720,808 | 11/1965 | Canada. |
| 698,217 | 10/1953 | Great Britain. |
| 964,647 | 7/1964 | Great Britain. |

LEON ZITVER, *Primary Examiner.*

J. E. EVANS, *Assistant Examiner.*

U.S. Cl. X.R.

260—459

UNITED STATES PATENT OFFICE
CERTIFICATE OF CORRECTION

Patent No. 3,449,446                          June 10, 1969

Francis J. Higgins

It is certified that error appears in the above identified patent and that said Letters Patent are hereby corrected as shown below:

Column 1, line 48, cancel "operation". Column 2, line 51, "produce" should read -- product --. Column 5, line 12, "order" should read -- odor --. Column 6, line 32, "lighted" should read -- lighter --. Column 7, line 34, "abvious" should read -- obvious --. Column 8, line 60, "colored" should read -- cooled --.

Signed and sealed this 24th day of March 1970.

(SEAL)
Attest:

Edward M. Fletcher, Jr.                      WILLIAM E. SCHUYLER, JR.
Attesting Officer                              Commissioner of Patents

UNITED STATES PATENT OFFICE
CERTIFICATE OF CORRECTION

Patent No. 3,449,446                                            June 10, 1969

Francis J. Higgins

It is certified that error appears in the above identified patent and that said Letters Patent are hereby corrected as shown below:

Column 8, line 41, cancel "aluminum,".

Signed and sealed this 17th day of November 1970.

(SEAL)
Attest:

Edward M. Fletcher, Jr.                                  WILLIAM E. SCHUYLER, JR.
Attesting Officer                                                     Commissioner of Patents